United States Patent
Kang et al.

(10) Patent No.: US 12,084,113 B2
(45) Date of Patent: Sep. 10, 2024

(54) VEHICLE FRONT STRUCTURE

(71) Applicants: Hyundai Motor Company, Seoul (KR); Kia Corporation, Seoul (KR)

(72) Inventors: Jeon Woong Kang, Hwaseong-si (KR); Huen Sick Min, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 326 days.

(21) Appl. No.: 17/726,851

(22) Filed: Apr. 22, 2022

(65) Prior Publication Data

US 2023/0065302 A1    Mar. 2, 2023

(30) Foreign Application Priority Data

Aug. 27, 2021   (KR) .................. 10-2021-0114284

(51) Int. Cl.
  *B62D 25/08*   (2006.01)
  *B62D 21/11*   (2006.01)
  *B62D 21/15*   (2006.01)
  *B62D 27/02*   (2006.01)

(52) U.S. Cl.
  CPC ............ *B62D 21/152* (2013.01); *B62D 21/11* (2013.01); *B62D 25/08* (2013.01); *B62D 27/023* (2013.01)

(58) Field of Classification Search
  CPC .... B62D 25/08; B62D 25/082; B62D 25/085; B62D 25/088; B62D 27/023; B62D 23/005; B62D 21/152; B62D 21/11
  USPC .............................. 296/205, 23.01, 3, 29, 30
  See application file for complete search history.

(56) References Cited

U.S. PATENT DOCUMENTS

| | | | | |
|---|---|---|---|---|
| 2,269,451 A | * | 1/1942 | Ford | B62D 23/005 |
| | | | | 296/205 |
| 4,735,355 A | * | 4/1988 | Browning | B62D 21/08 |
| | | | | 228/175 |
| 6,533,348 B1 | * | 3/2003 | Jaekel | B62D 29/00 |
| | | | | 296/205 |
| 11,364,957 B2 | * | 6/2022 | Ito | B62D 25/2027 |
| 2016/0368535 A1 | * | 12/2016 | Kim | B62D 21/08 |
| 2020/0180704 A1 | | 6/2020 | Murata et al. | |
| 2020/0207418 A1 | | 7/2020 | Takakuwa | |
| 2021/0024133 A1 | | 1/2021 | Kim et al. | |

FOREIGN PATENT DOCUMENTS

| | | | |
|---|---|---|---|
| DE | 60317743 T2 * | 11/2008 | ........ B62D 25/082 |
| JP | H0622166 U | 3/1994 | |
| JP | 2009220718 A | 10/2009 | |
| JP | 2013159223 A | 8/2013 | |
| KR | 20210001019 A * | 6/2021 | |
| WO | 2015156052 A1 | 10/2015 | |

OTHER PUBLICATIONS

Text DE60317743 (Year: 2008).*
Text KR20210001019 (Year: 2021).*

* cited by examiner

*Primary Examiner* — Dennis H Pedder
(74) *Attorney, Agent, or Firm* — Slater Matsil, LLP (57) ABSTRACT

An embodiment vehicle front structure includes a pair of front side members, a pair of fender upper members located above the pair of front side members, respectively, a bumper back beam connecting front ends of the pair of front side members, and a front end module connected to the pair of front side members and the pair of fender upper members.

20 Claims, 10 Drawing Sheets

VEHICLE FRONT STRUCTURE

CROSS-REFERENCE TO RELATED APPLICATIONS

This application claims the benefit of Korean Patent Application No. 10-2021-0114284, filed on Aug. 27, 2021, which application is hereby incorporated herein by reference.

TECHNICAL FIELD

The present disclosure relates to a vehicle front structure.

BACKGROUND

A frame of a vehicle, which is a structure designed to install chassis components and/or a vehicle body, should be sufficiently protected from local or overall damages due to deformation, torsion, tension, compression, and/or vibration caused by the vehicle's propulsion force, brake action, a centrifugal force during steering, an impact from a road surface, a vertical load due to the weight of the vehicle body, and various reaction forces. It should be of a structure that can sufficiently absorb impact energy applied to the vehicle in the event of a collision.

Due to the diversification of the automobile market, a vehicle body structure is being changed in various ways from an existing monocoque structure to a novel structure such as a purpose built vehicle (PBV) frame or a space frame, to meet each vehicle's purpose. In particular, a low-cost electric vehicle (EV) requires a vehicle body structure which is created by breaking an existing method in order to maximize profitability.

Existing vehicles use pressed steel materials and aluminum materials for vehicle bodies, and thus the material cost and investment cost thereof may be relatively high.

The above information described in this background section is provided to assist in understanding the background of the inventive concept, and may include any technical concept which is not considered as the prior art that is already known to those skilled in the art.

SUMMARY

The present disclosure relates to a vehicle front structure. Particular embodiments relate to a vehicle front structure designed to spread and distribute a load transferred to the front of the vehicle in three directions.

Embodiments of the present disclosure can solve problems occurring in the prior art while advantages achieved by the prior art are maintained intact.

An embodiment of the present disclosure provides a vehicle front structure capable of significantly reducing its manufacturing cost by using relatively inexpensive materials, such as mass-produced steel pipes, compared to pressed steel materials and aluminum materials.

According to an embodiment of the present disclosure, a vehicle front structure may include a pair of front side members, a pair of fender upper members located above the pair of front side members, respectively, a bumper back beam connecting front ends of the pair of front side members, and a front end module connected to the pair of front side members and the pair of fender upper members.

As the pair of front side members, the pair of fender upper members, the bumper back beam, the front end module, and a plurality of connection members are joined to each other, the vehicle front structure may form a compact module.

Each fender upper member may connect the front end module and a corresponding front pillar, and the fender upper member may extend in a longitudinal direction of the vehicle.

As the front end module is connected to the front pillar through the fender upper member, an upper load path may be defined by the fender upper member along the longitudinal direction of the vehicle, and a portion of an impact load transferred to the front end module and/or the bumper back beam may be transferred to the front pillar through the fender upper member.

In an existing vehicle, the impact load transferred to the front end module and/or the bumper back beam is transferred to the front pillar through the front side member and/or a front subframe, and accordingly the impact load is very likely to be transferred to a battery assembly disposed under a floor of the vehicle, which results in poor crash performance of the battery assembly. On the other hand, in the vehicle front structure according to an exemplary embodiment of the present disclosure, as the fender upper member connects the front end module and the corresponding front pillar, it may define the upper load path extending along the longitudinal direction of the vehicle above the front side member, and a portion of the impact load may be transferred to the front pillar through the fender upper member, and accordingly the transfer of the impact load to the battery assembly disposed under the floor of the vehicle may be minimized or prevented. Thus, crash performance of the battery assembly may be significantly improved. That is, by increasing the number of load paths defined along the longitudinal direction of the vehicle, the impact load may be more uniformly distributed.

Each fender upper member may include a first extension portion connected to the front end module, a second extension portion connected to a front pillar, and a shock absorber bracket mounted between the first extension portion and the second extension portion.

As the shock absorber bracket is mounted between the first extension portion and the second extension portion, a load transferred to the shock absorber bracket may be uniformly distributed through the first extension portion and the second extension portion.

The first extension portion may include a first attachment provided on a rear portion thereof, the second extension portion may include a second attachment provided on a front portion thereof, and the first extension portion and the second extension portion may be attached to an exterior surface of the shock absorber bracket to surround the shock absorber bracket.

As the first attachment of the first extension portion and the second attachment of the second extension portion are attached to the exterior surface of the shock absorber bracket to surround the shock absorber bracket in an annular form, the shock absorber bracket may be stably and firmly supported to the first extension portion and the second extension portion.

The first extension portion and the second extension portion may be made of a mass-produced steel pipe having a closed cross section, and a cross-sectional area of the first extension portion may be the same as that of the second extension portion.

The shock absorber bracket may include a first panel and a second panel mounted on the first panel, and the first panel and the second panel may be joined to have a cavity defined therein.

As the shock absorber bracket is designed to have a closed cross section by joining the first panel and the second panel, stiffness of the shock absorber bracket at a mounting point may be improved.

The vehicle front structure may further include a plurality of connection members connecting each fender upper member and a corresponding front side member in a height direction of the vehicle.

As the connection members connect the fender upper member and the corresponding front side member in the height direction of the vehicle, a load transferred from a vehicle wheel to the shock absorber and the shock absorber bracket may be uniformly distributed to the fender upper member and the front side member through the connection members.

The plurality of connection members may include a first connection member close to the front end module, and a second connection member spaced apart from the first connection member toward the rear of the vehicle.

The two connection members may reliably connect the fender upper member and the front side member in the height direction of the vehicle, thereby uniformly distributing a vertical load received from the vehicle wheel.

The first connection member and the second connection member may be made of a mass-produced steel pipe having a closed cross section, and a cross-sectional area of the first connection member may be the same as that of the second connection member.

Each front side member may include a pair of extension portions provided on the front end thereof, the pair of extension portions may define an opening or groove therebetween, each end portion of the bumper back beam may be inserted or fitted into the opening of the corresponding front side member, and the pair of extension portions may be joined to the end portion of the bumper back beam.

As the end portion of the bumper back beam is inserted or fitted into the opening of the corresponding front side member, and the pair of extension portions are joined to the end portion of the bumper back beam, joining stiffness between the bumper back beam and the front end of the front side member may be improved.

Each extension portion may have a recess which is recessed toward the bumper back beam.

Stiffness of the extension portion may be increased by the recess, and thus the joining stiffness between the extension portions of the front side member and the bumper back beam may be significantly improved.

Each extension portion and the bumper back beam may be fastened by connecting a fastener to the recess.

Accordingly, each of the extension portions may be firmly joined to the bumper back beam through the recess and the fastener, and thus the joining stiffness between the extension portions of the front side member and the bumper back beam may be significantly improved.

Each front side member may be made of a mass-produced steel pipe having a closed cross section.

The front end module may include an upper member, a lower member located below the upper member, and a pair of side members connecting both ends of the upper member and both ends of the lower member, respectively.

Each of the upper member, the lower member, and the pair of side members may be made of a mass-produced steel pipe having a closed cross section.

The upper member and each side member may have the same cross-sectional area, and the lower member may have a larger cross-sectional area than the cross-sectional area of the upper member and the cross-sectional area of the side member.

The bumper back beam may be made of a high-tensile strength steel plate.

Since the bumper back beam receives an impact load directly in the event of a frontal collision of the vehicle, it needs to be made of a high-tensile strength steel plate.

The pair of fender upper members may be connected to an upper crossmember through a pair of strut bars.

As the pair of fender upper members are connected to the upper crossmember through the pair of strut bars, a transverse moment acting on the pair of fender upper members may be effectively cancelled.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of the embodiments of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
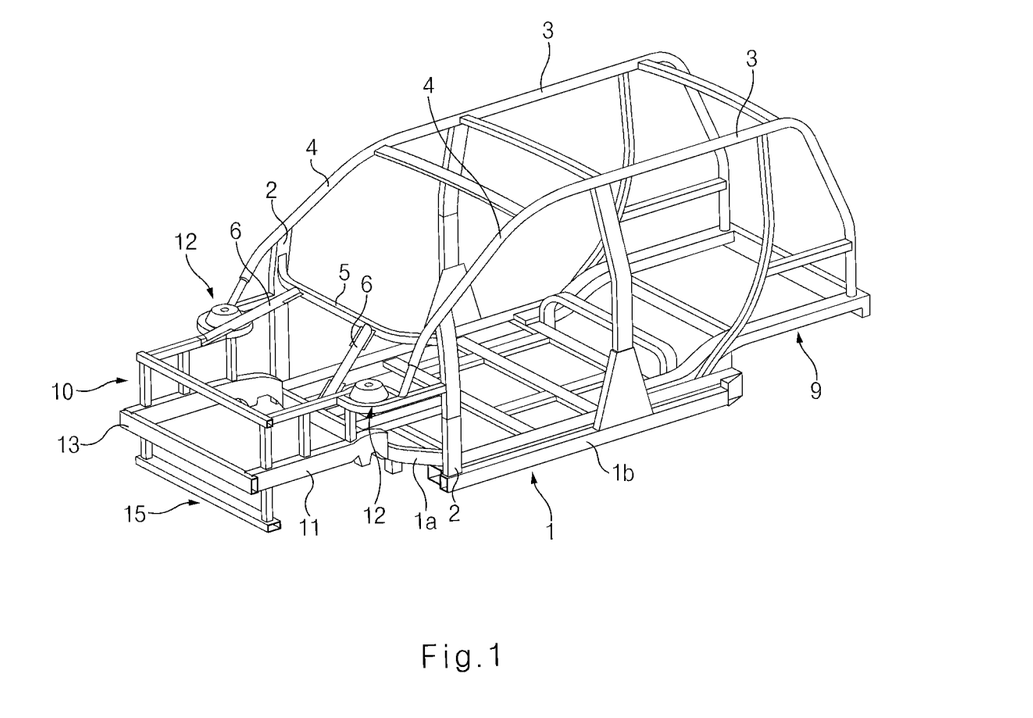
FIG. 1 illustrates a vehicle front structure according to an exemplary embodiment of the present disclosure, which is connected to a vehicle body frame.

FIG. 1 illustrates a frame of a vehicle to which a vehicle front structure 10 according to an exemplary embodiment of the present disclosure is applied.

Referring to FIG. 1, the frame of the vehicle may include a lower frame 1, a pair of front pillars 2 disposed in front of the lower frame 1, a pair of roof rails 3 connected to the pair of front pillars 2, respectively, a pair of windshield members 4 extending obliquely from the pair of roof rails 3 to a pair of fender upper members 12, and an upper crossmember 5 connecting the pair of front pillars 2.

The lower frame 1 may include a plurality of longitudinal members, a plurality of transverse members, a pair of side sills 1b, and a front crossmember is connecting the pair of side sills 1b. The pair of side sills 1b may be spaced apart from each other in a width direction of the vehicle, and each side sill 1b may extend in a longitudinal direction of the vehicle.

The pair of front pillars 2 may be spaced apart from each other in the width direction of the vehicle, and each front pillar 2 may extend in a height direction of the vehicle. Each front pillar 2 may extend from the corresponding side sill 1b of the lower frame 1 to the corresponding windshield member 4. A bottom end of the front pillar 2 may be joined to the side sill 1b of the lower frame 1, and a top end of the front pillar 2 may be joined to the windshield member 4.

The upper crossmember 5 may extend in the width direction of the vehicle, and end portions of the upper crossmember 5 may be joined to the corresponding front pillars 2, respectively.

The vehicle front structure 10 according to an exemplary embodiment of the present disclosure may be connected to the lower frame 1, the pair of front pillars 2, and the pair of windshield members 4.

Figure 2:
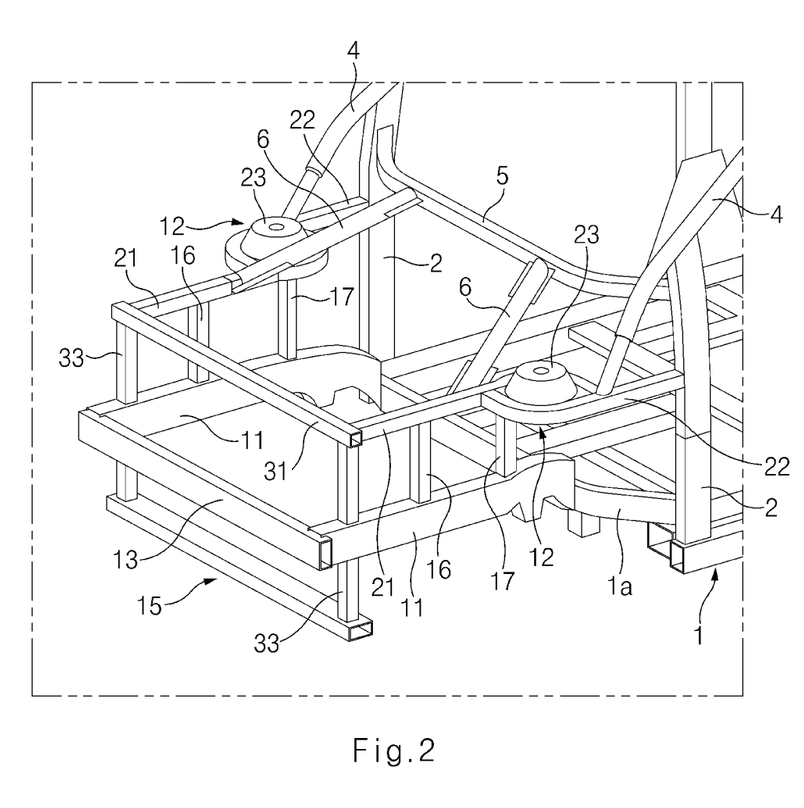
FIG. 2 illustrates a perspective view of a vehicle front structure according to an exemplary embodiment of the present disclosure.
Figure 3:
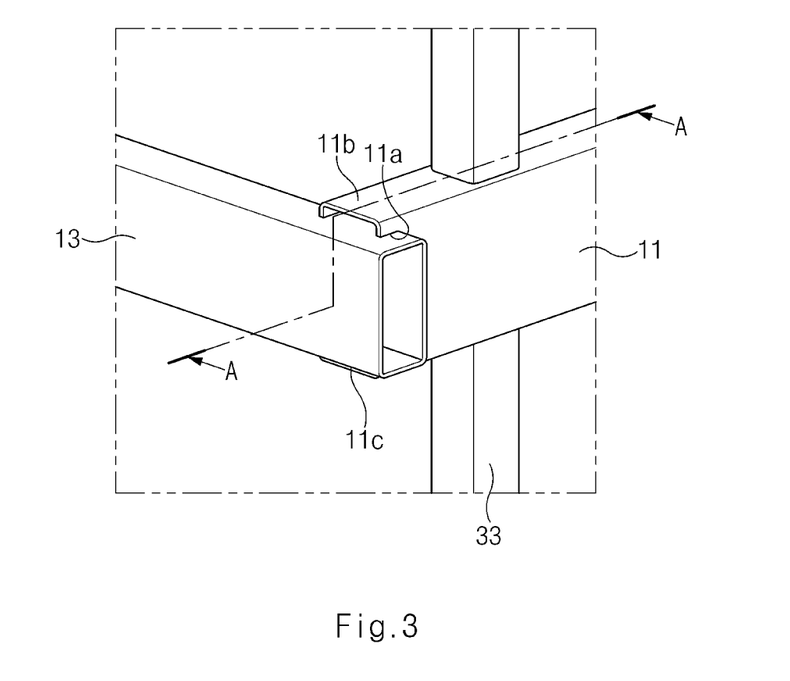
FIG. 3 illustrates a perspective view of a front side member and a bumper back beam which are joined in the vehicle front structure illustrated in FIG. 2.

Referring to FIGS. 1 to 3, the vehicle front structure 10 according to an exemplary embodiment of the present disclosure may include a pair of front side members 11, a pair of fender upper members 12 disposed above the pair of front side members 11, a bumper back beam 13 connecting front ends of the pair of front side members 11, and a front end module 15 connected to the pair of front side members 11 and the pair of fender upper members 12.

The pair of front side members 11 may be spaced apart from each other in the width direction of the vehicle, and each front side member 11 may extend in the longitudinal direction of the vehicle. In particular, the front side member 11 may be made of a mass-produced steel pipe having an angular cross section or a circular cross section with a cavity defined therein, and accordingly the front side member 11 may have a closed cross section.

Each front side member 11 may extend from the front crossmember 1a of the lower frame 1 of the vehicle body toward the front of the vehicle. A rear end of the front side member 11 may be joined to the front crossmember 1a of the lower frame 1 using fasteners, welding, and/or the like, and the front end of the front side member 11 may be joined to a corresponding end portion of the bumper back beam 13 using fasteners, welding, and/or the like.

Figure 4:
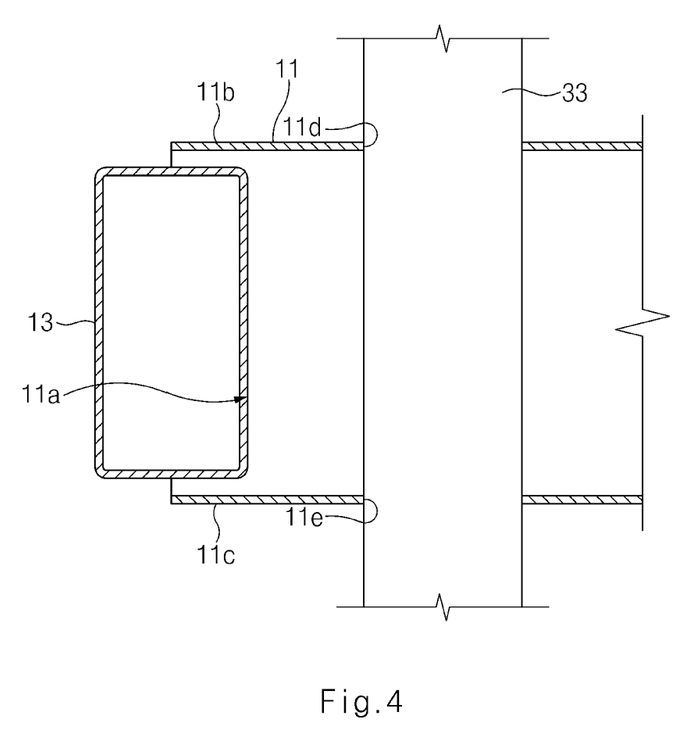
FIG. 4 illustrates a cross-sectional view, taken along line A-A of FIG. 3.

Referring to FIGS. 3 and 4, each front side member 11 may have an opening or groove 11a provided in the front end thereof, and the opening 11a may be precisely formed in the front side member 11 by laser processing. Each end portion of the bumper back beam 13 may be inserted or fitted into the opening 11a of the corresponding front side member 11. The opening or groove 11a may have a U-shaped or L-shaped cross section which is complementary to at least a portion of the exterior of the bumper back beam 13. The front side member 11 may include a pair of extension portions 11b and 11c provided on the front end thereof, and the opening 11a may be defined by the pair of extension portions 11b and 11c. The pair of extension portions 11b and 11c may be spaced apart from each other with the opening 11a therebetween, and each of the extension portions 11b and 11c may extend in a longitudinal direction of the front side member 11. Each end portion of the bumper back beam 13 may be inserted or fitted into the opening 11a of the corresponding front side member 11, and the extension portions 11b and 11c of the front side member 11 and the bumper back beam 13 may be joined to each other using fasteners, welding (e.g., $CO_2$ welding), and/or the like. As the end portion of the bumper back beam 13 is inserted and jointed to the opening 11a of the corresponding front side member 11, joining stiffness between the bumper back beam 13 and the front end of the front side member 11 may be improved, and thus the front end of the front side member 11 may be firmly fixed to the bumper back beam 13.

Figure 5:
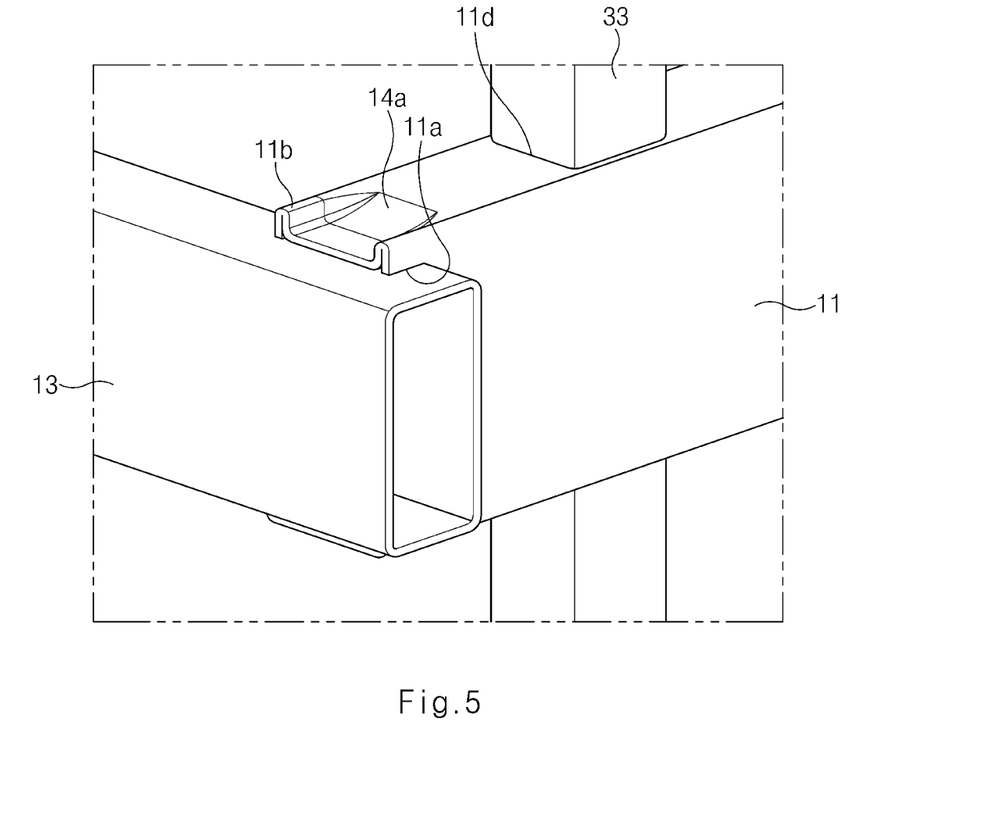
FIG. 5 illustrates a modification to the embodiment of FIG. 3.

Referring to FIG. 5, the extension portions 11b and 11c of each front side member 11 may have respective recesses or recessed beads 14a, and the recesses 14a may be recessed from the extension portions 11b and 11c of the front side member 11 toward the bumper back beam 13, respectively. The extension portions 11b and 11c may be joined to the bumper back beam 13 by welding and/or the like. Stiffness of the extension portions 11b and 11c may be increased by the recesses 14a, and thus the joining stiffness between the extension portions 11b and 11c of the front side member 11 and the bumper back beam 13 may be significantly improved.

Figure 6:
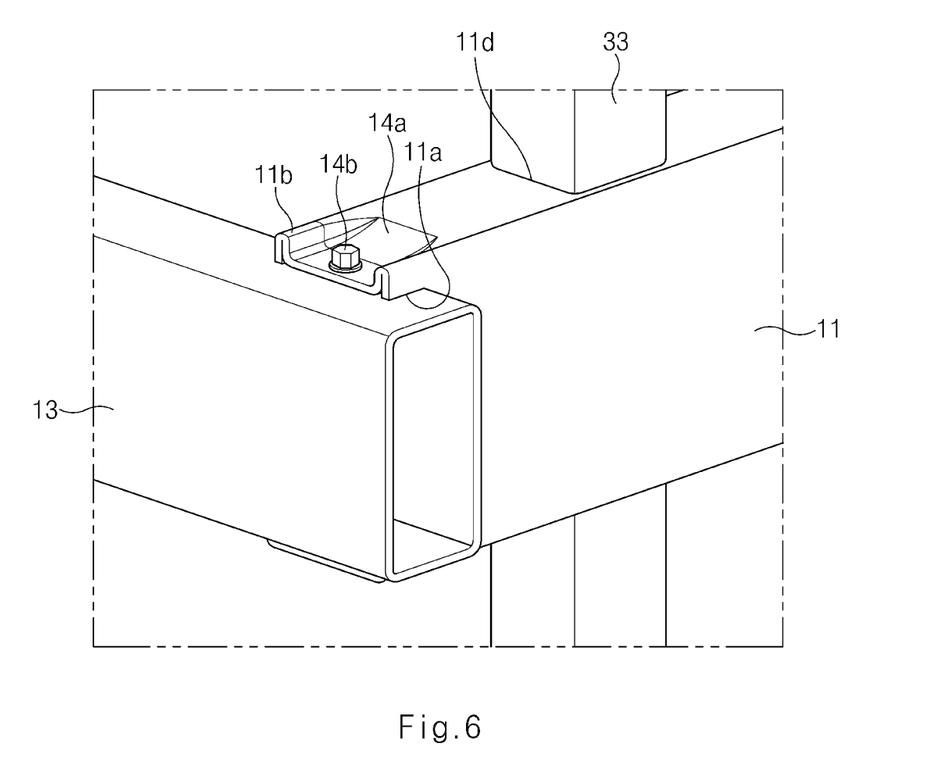
FIG. 6 illustrates another modification to the embodiment of FIG. 3.

Referring to FIG. 6, each of the extension portions 11b and 11c of the front side member 11 may be joined to the bumper back beam 13 using a fastener 14b. As the fastener 14b is connected to the recess 14a of each of the extension portions 11b and 11c, the extension portions 11b and 11c and the corresponding end portion of the bumper back beam 13 may be firmly fastened. Accordingly, each of the extension portions 11b and 11c may be joined to the bumper back beam 13 through the recess 14a and the fastener 14b, and thus mounting stiffness between the extension portions 11b and 11c of the front side member 11 and the bumper back beam 13 may be significantly improved.

The pair of fender upper members 12 may be spaced apart from each other in the width direction of the vehicle, and each fender upper member 12 may extend in the longitudinal direction of the vehicle. The fender upper member 12 may be spaced apart upwardly from the corresponding front side member 11.

Figure 7:
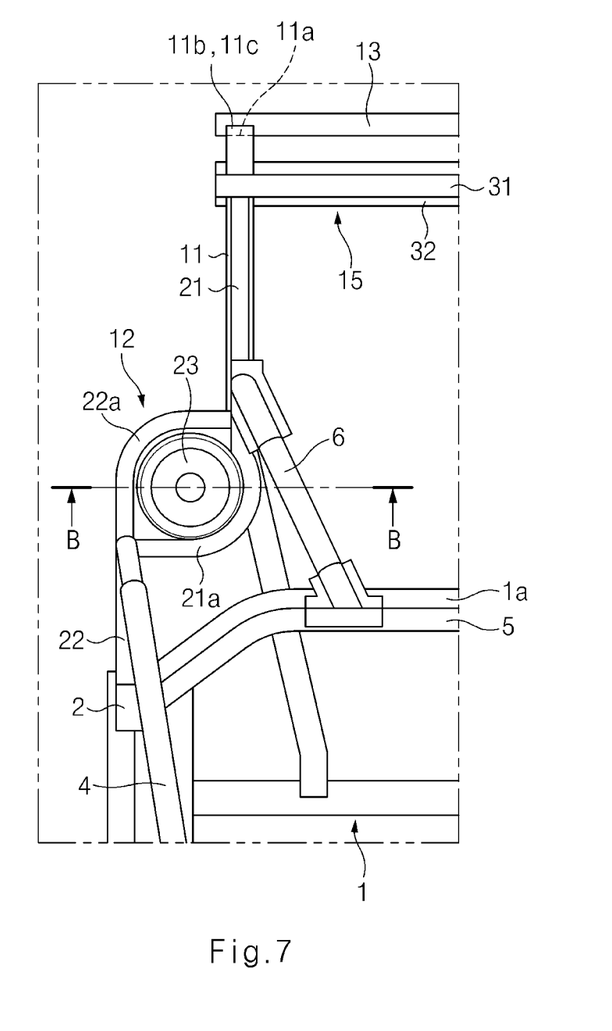
FIG. 7 illustrates a plan view of a left portion of the vehicle front structure illustrated in FIG. 2.
Figure 8:
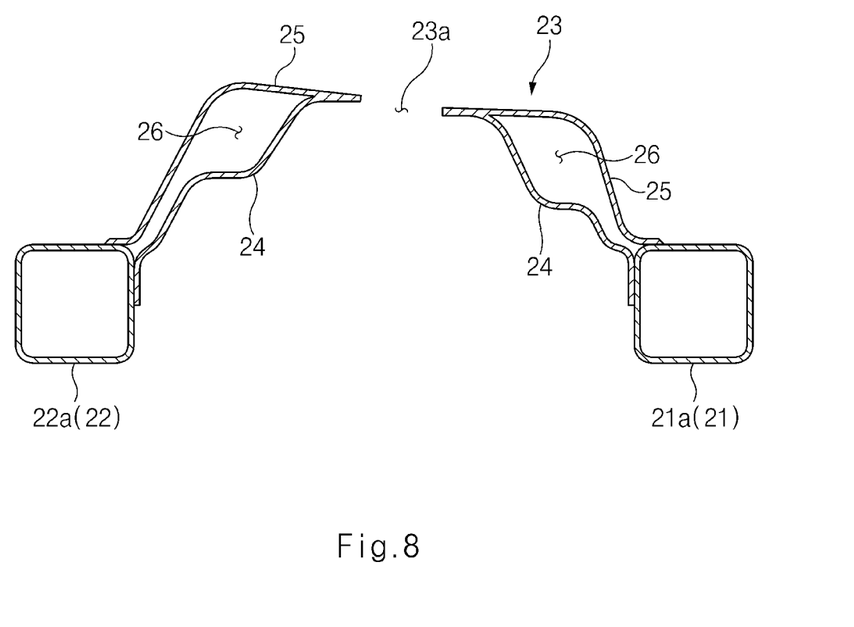
FIG. 8 illustrates a cross-sectional view, taken along line B-B of FIG. 7.

Referring to FIGS. 2, 7, and 8, each fender upper member 12 may connect the front end module 15 and the front pillar 2. Specifically, the fender upper member 12 may include a first extension portion 21 connected to the front end module 15, a second extension portion 22 connected to the front pillar 2, and a shock absorber bracket 23 mounted between the first extension portion 21 and the second extension portion 22. As the shock absorber bracket 23 is mounted between the first extension portion 21 and the second extension portion 22, a load transferred to the shock absorber bracket 23 may be uniformly distributed through the first extension portion 21 and the second extension portion 22.

The first extension portion 21 may extend in the longitudinal direction of the vehicle, and a front end of the first extension portion 21 may be joined to the front end module 15 using fasteners, welding (e.g., $CO_2$ welding), and/or the like so that the first extension portion 21 may face the front of the vehicle. The second extension portion 22 may extend in the longitudinal direction of the vehicle, and a rear end of the second extension portion 22 may be joined to the front pillar 2 using fasteners, welding (e.g., CO 2 welding), and/or the like so that the second extension portion 22 may face the rear of the vehicle.

Referring to FIG. 7, an axis of the first extension portion 21 may be offset to an axis of the second extension portion 22 in the width direction of the vehicle. For example, the second extension portion 22 may be closer to the exterior of the vehicle than the first extension portion 21, and the first extension portion 21 may be closer to the center of the vehicle than the second extension portion 22.

The first extension portion 21 may include a first attachment 21a provided on a rear portion thereof, and the first attachment 21a may be bent toward the front of the second extension portion 22. That is, the first attachment 21a may be bent from the rear portion of the first extension portion 21 toward the exterior of the vehicle.

The second extension portion 22 may include a second attachment 22a provided on a front portion thereof, and the second attachment 22a may be bent toward the rear of the first extension portion 21. That is, the second attachment 22a may be bent from the front portion of the second extension portion 22 toward the center of the vehicle.

The first extension portion 21 and the second extension portion 22 may face each other on both sides of the shock absorber bracket 23 in the longitudinal direction of the vehicle, and thus the load transferred to the shock absorber bracket 23 may be more uniformly spread.

The first extension portion 21 and the second extension portion 22 may be made of a mass-produced steel pipe having an angular cross section or a circular cross section with a cavity defined therein, and accordingly the first extension portion 21 and the second extension portion 22 may have a closed cross section. The cross-sectional area, shape, and size of the first extension portion 21 may be the same as those of the second extension portion 22.

Referring to FIG. 7, the first attachment 21a may be attached to a portion of an exterior surface of the shock absorber bracket 23 by welding (e.g., $CO_2$ welding), using fasteners, and/or the like, and the second attachment 22a may be attached to a remaining portion of the exterior surface of the shock absorber bracket 23 by welding (e.g., $CO_2$ welding), using fasteners, and/or the like. The first attachment 21a may surround the portion of the exterior surface of the shock absorber bracket 23, and the second attachment 22a may surround the remaining portion of the exterior surface of the shock absorber bracket 23 so that the first attachment 21a and the second attachment 22a may surround the exterior surface of the shock absorber bracket 23 in an annular form. Thus, the shock absorber bracket 23 may be stably and firmly supported to the first extension portion 21 and the second extension portion 22.

A free end of the first attachment 21a may be joined to the second attachment 22a using fasteners, welding (e.g., $CO_2$ welding), and/or the like, and a free end of the second attachment 22a may be joined to the first attachment 21a using fasteners, welding (e.g., $CO_2$ welding), and/or the like.

Referring to FIG. 8, the shock absorber bracket 23 may include a mounting hole 23a provided in the center thereof, and a top end of a shock absorber may be mounted in the mounting hole 23a. The shock absorber bracket 23 may include a first panel 24, and a second panel 25 disposed above the first panel 24. An inner periphery of the first panel 24 and an inner periphery of the second panel 25 may be tightly joined by welding (e.g., $CO_2$ welding) and/or the like, and an outer periphery of the first panel 24 and an outer periphery of the second panel 25 may be tightly joined by welding (e.g., $CO_2$ welding) and/or the like. The first panel 24 and the second panel 25 may have a cavity 26 defined therein. As the shock absorber bracket 23 has a closed cross section by joining the first panel 24 and the second panel 25, stiffness of the shock absorber bracket 23 at a mounting point may be improved.

In an existing vehicle, a shock absorber bracket (also referred to as a damper housing, a shock absorber housing, or a suspension housing) is connected between a fender upper member and a front pillar, but an additional reinforcing member for increasing stiffness of the shock absorber bracket is required. Accordingly, the manufacturing cost and weight may be relatively increased.

On the other hand, in the vehicle front structure according to an exemplary embodiment of the present disclosure, the shock absorber bracket 23 may be integrally joined to the fender upper member 12, and the fender upper member 12 may connect the front end module 15 and the front pillar 2 in the longitudinal direction of the vehicle, and thus the manufacturing cost and weight of the vehicle front structure may be relatively reduced.

Referring to FIGS. 1 and 2, a pair of strut bars 6 may extend from the upper crossmember 5 toward the pair of fender upper members 12, respectively. The pair of strut bars 6 may be spaced apart from each other in a longitudinal direction of the upper crossmember 5. A top end of each strut bar 6 may be connected to a portion of the upper crossmember 5 adjacent to the end of the upper crossmember 5, and a bottom end of the strut bar 6 may be connected to the first extension portion 21 of the corresponding fender upper member 12. That is, the pair of fender upper members 12 may be connected to the upper crossmember 5 through the pair of strut bars 6.

The strut bars 6 may connect the upper crossmember 5 and the first extension portions 21 of the corresponding fender upper members 12, and the pair of front side members 11 and the pair of fender upper members 12 may be spaced apart from each other in the width direction of the vehicle, and accordingly a transverse moment acting on the pair of front side members 11 and the pair of fender upper members 12 may be cancelled by the pair of strut bars 6.

The bumper back beam 13 may extend in the width direction of the vehicle, and the bumper back beam 13 may connect the front ends of the pair of front side members 11. Each end portion of the bumper back beam 13 may be joined to the front end of the corresponding front side member 11. In particular, the end portion of the bumper back beam 13 may be inserted and jointed to the opening 11a of the corresponding front side member 11 as illustrated in FIGS. 3 and 4.

According to an exemplary embodiment, the bumper back beam 13 may be made of a high-tensile strength steel plate through hot stamping, hot forming, press hardening, and/or roll forming.

The front end module 15 may be a frame supporting a heat exchanger such as a radiator, a condenser, and an intercooler.

Specifically, the front end module 15 may include an upper member 31, a lower member 32 located below the upper member 31, and a pair of side members 33 connecting both ends of the upper member 31 and both ends of the lower member 32, respectively. The front end module 15 may have a cavity defined by the upper member 31, the lower member 32, and the pair of side members 33.

The upper member 31 and the lower member 32 may extend in the width direction of the vehicle, and the pair of side members 33 may extend in the height direction of the vehicle.

Each of the upper member 31, the lower member 32, and the side member 33 may be made of a mass-produced steel pipe having an angular cross section or a circular cross section with a cavity defined therein, and accordingly the upper member 31, the lower member 32, and the side member 33 may have a closed cross section.

The upper member 31 and each side member 33 may have the same cross-sectional area. The lower member 32 may have a larger cross-sectional area than the cross-sectional area of the upper member 31 and the cross-sectional area of the side member 33 so that the lower member 32 may directly support the bottom of the heat exchanger.

The pair of fender upper members 12 may be connected to a top end of the front end module 15. In particular, the fender upper member 12 may be joined to the upper member 31 of the front end module 15 using fasteners, welding (e.g., $CO_2$ welding), and/or the like. Referring to FIG. 4, each side member 33 may extend through holes 11$d$ and 11$e$ of the corresponding front side member 11, and the side member 33 may be joined to the corresponding front side member 11 by welding (e.g., $CO_2$ welding) and/or the like. Accordingly, the front end module 15 may be directly connected to the front side member 11, and thus a load transferred to the front end module 15 may be transferred to the front pillar 2 through the front side member 11.

The vehicle front structure 10 according to an exemplary embodiment of the present disclosure may include a plurality of connection members 16 and 17 connecting the fender upper members 12 and the front side members 11 in the height direction of the vehicle.

Figure 9:
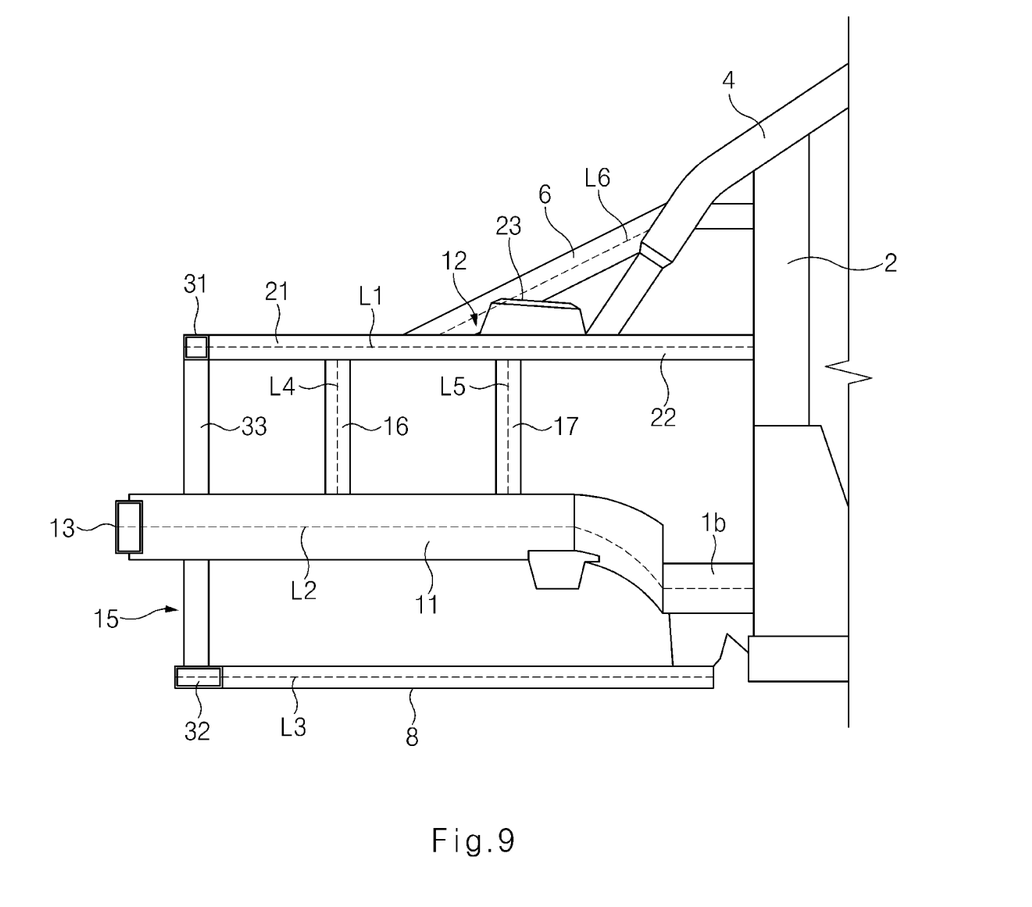
FIG. 9 illustrates a side view of a left portion of the vehicle front structure illustrated in FIG. 2.

Referring to FIGS. 2 and 9, the plurality of connection members 16 and 17 may include a pair of first connection members 16 and a pair of second connection members 17.

The pair of first connection members 16 may be spaced apart from each other in the width direction of the vehicle, and the pair of first connection members 16 may be closer to the front end module 15 than the pair of second connection members 17. Each first connection member 16 may extend straightly in the height direction of the vehicle, and the first connection member 16 may connect the corresponding fender upper member 12 and the corresponding front side member 11 in the height direction of the vehicle. A top end of the first connection member 16 may be joined to the first extension portion 21 of the fender upper member 12 using fasteners, welding (e.g., $CO_2$ welding), and/or the like, and a bottom end of the first connection member 16 may be joined to the front side member 11 using fasteners, welding (e.g., $CO_2$ welding), and/or the like. The first connection member 16 may be made of a mass-produced steel pipe having an angular cross section or a circular cross section with a cavity defined therein, and accordingly the first connection member 16 may have a closed cross section.

The pair of second connection members 17 may be spaced apart from each other in the width direction of the vehicle, and each second connection member 17 may be spaced apart from the corresponding first connection member 16 toward the rear of the vehicle. The second connection member 17 may extend straightly in the height direction of the vehicle, and the second connection member 17 may connect the corresponding fender upper member 12 and the corresponding front side member 11 in the height direction of the vehicle. A top end of the second connection member 17 may be joined to the first extension portion 21 of the fender upper member 12 using fasteners, welding (e.g., $CO_2$ welding), and/or the like, and a bottom end of the second connection member 17 may be joined to the front side member 11 using fasteners, welding (e.g., $CO_2$ welding), and/or the like. In particular, the top end of the second connection member 17 may be joined to the first attachment 21$a$ of the first extension portion 21 adjacent to the shock absorber bracket 23 using fasteners, welding (e.g., $CO_2$ welding), and/or the like, and accordingly the second connection member 17 may increase the stiffness of the shock absorber bracket 23 at the mounting point. The second connection member 17 may be made of a mass-produced steel pipe having an angular cross section or a circular cross section with a cavity defined therein, and accordingly the second connection member 17 may have a closed cross section.

The cross-sectional area, shape, and size of the first connection member 16 may be the same as those of the second connection member 17.

As the plurality of connection members 16 and 17 connect the fender upper member 12 and the front side member 11 in the height direction of the vehicle, a load transferred vertically from a vehicle wheel to the shock absorber and the shock absorber bracket 23 may be uniformly distributed through the plurality of connection members 16 and 17 in the height direction of the vehicle. That is, the plurality of connection members 16 and 17 may stably support the vertical load received from the vehicle wheel.

In particular, the pair of first connection members 16 and the pair of second connection members 17 may connect the fender upper members 12 and the front side members 11 vertically on both sides of the vehicle front structure 10 so that torsional stiffness of the vehicle front structure 10 may be significantly increased (for example, 21.4%) compared to the related art.

Referring to FIG. 9, the vehicle front structure 10 according to an exemplary embodiment of the present disclosure may further include a front subframe 8 disposed below the pair of front side members 11. The front subframe 8 may be connected from the lower member 32 of the front end module 15 to the rear portion of the front side member 11 or the front crossmember 1$a$ of the lower frame 1.

In an existing vehicle, since a fender upper member is not connected to a front pillar, a load transferred to a bumper back beam and/or a front end module may be distributed along a front side member and/or a front subframe. In particular, most of an impact load may be transferred to a battery assembly through the front subframe, resulting in poor crash performance of the battery assembly.

Meanwhile, according to an exemplary embodiment of the present disclosure, load paths may be defined as illustrated in FIG. 9, as follows: an upper load path L1 may be defined along the fender upper member 12 as the fender upper member 12 extends in the longitudinal direction of the vehicle; an intermediate load path L2 may be defined along the front side member 11 as the front side member 11 extends in the longitudinal direction of the vehicle under the fender upper member 12; and a lower load path L3 may be defined along the front subframe 8 as the front subframe 8 extends in the longitudinal direction of the vehicle under the front side member 11. Accordingly, the impact load transferred to the bumper back beam 13 and/or the front end module 15 may be uniformly distributed through the three paths, that is, the upper load path L1, the intermediate load path L2, and the lower load path L3. In particular, a portion of the impact load may be transferred to the front pillar 2 through the upper load path L1, and accordingly the transfer of the impact load to the battery assembly may be minimized or prevented. Thus, crash performance of the battery assembly may be significantly improved.

Referring to FIG. 9, a first vertical load path L4 may be defined along the first connection member 16 as the first connection member 16 extends in the height direction of the vehicle, and a second vertical load path L5 may be defined along the second connection member 17 as the second connection member 17 extends in the height direction of the vehicle. Accordingly, the first connection member 16 and the second connection member 17 may stably support the vertical load received from the vehicle wheel. In addition, an inclined load path L6 may be defined along the strut bar 6 as the strut bar 6 connecting the fender upper member 12 and the upper crossmember 5 extends obliquely toward the first extension portion 21 of the fender upper member 12. Accordingly, a load may be uniformly distributed between the fender upper member 12 and the upper crossmember 5.

Figure 10:
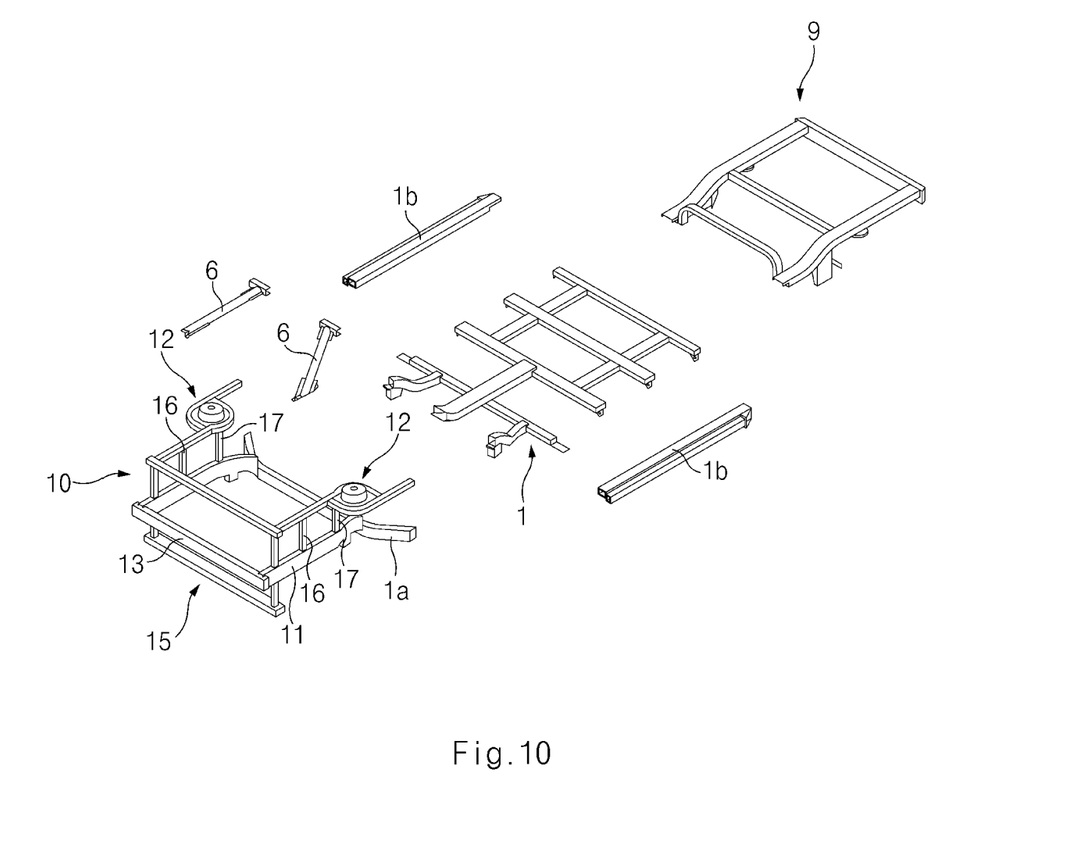
FIG. 10 illustrates a process of assembling a vehicle body frame and a vehicle front structure according to an exemplary embodiment of the present disclosure.

Referring to FIG. 10, the vehicle front structure 10 according to an exemplary embodiment of the present disclosure may include the pair of front side members 11, the pair of fender upper members 12, the front end module 15, and the bumper back beam 13 which form a single module. In addition, as the front crossmember 1*a* of the lower frame 1 is joined to the rear ends of the pair of front side members 11, the vehicle front structure 10 according to an exemplary embodiment of the present disclosure may further include the front crossmember 1*a*. The pair of strut bars 6 may be loaded vertically and downwardly on the modularized vehicle front structure 10, and the lower frame 1 and a rear frame 9 may be loaded and assembled to the rear of the vehicle front structure 10. As the vehicle front structure 10 is modularized, an assembly process thereof may be simplified and a warehousing unit may be minimized.

As described above, the front side member 11, the first extension portion 21 and the second extension portion 22 of the fender upper member 12, the upper member 31, the lower member 32, and the side member 33 of the front end module 15, the first connection member 16, and the second connection member 17 may be made of a mass-produced steel pipe having a closed cross section, thus the weights and material costs thereof may be reduced.

As set forth above, according to exemplary embodiments of the present disclosure, the vehicle front structure may form a space frame so that modularization thereof may be facilitated. By applying an existing mass-produced steel pipe to each component (the front end module, the fender upper member, the front side member, the bumper back beam, etc.) of the vehicle front structure, material and investment costs may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle front structure comprising:
a pair of front side members;
a pair of fender upper members located above the pair of front side members, respectively;
a bumper back beam connecting front ends of the pair of front side members; and
a front end module connected to the pair of front side members and the pair of fender upper members;
wherein each front side member includes a pair of extension portions provided on a front end thereof;
wherein the pair of extension portions define an opening therebetween;
wherein each end portion of the bumper back beam is inserted into the opening of the corresponding front side member;
wherein the pair of extension portions are joined to the end portion of the bumper back beam; and
wherein each extension portion has a recess which is recessed toward the bumper back beam.

2. The vehicle front structure according to claim 1, wherein:
each fender upper member connects the front end module and a corresponding front pillar; and
the fender upper member extends in a longitudinal direction of a vehicle.

3. The vehicle front structure according to claim 1, wherein each fender upper member includes a first extension portion connected to the front end module, a second extension portion connected to a front pillar, and a shock absorber bracket mounted between the first extension portion and the second extension portion.

4. The vehicle front structure according to claim 3, wherein:
the first extension portion includes a first attachment provided on a rear portion thereof;
the second extension portion includes a second attachment provided on a front portion thereof; and
the first extension portion and the second extension portion are attached to an exterior surface of the shock absorber bracket to surround the shock absorber bracket.

5. The vehicle front structure according to claim 3, wherein:
the first extension portion and the second extension portion comprise a mass-produced steel pipe having a closed cross section; and
a cross-sectional area of the first extension portion is the same as that of the second extension portion.

6. The vehicle front structure according to claim 3, wherein:
the shock absorber bracket includes a first panel and a second panel mounted on the first panel; and
the first panel and the second panel are joined to have a cavity defined therein.

7. The vehicle front structure according to claim 1, further comprising a plurality of connection members connecting each fender upper member and a corresponding front side member in a height direction of a vehicle.

8. The vehicle front structure according to claim 7, wherein the plurality of connection members includes a first connection member close to the front end module, and a second connection member spaced apart from the first connection member toward a rear of the vehicle.

9. The vehicle front structure according to claim 8, wherein:
the first connection member and the second connection member comprise a mass-produced steel pipe having a closed cross section; and a cross-sectional area of the first connection member is the same as that of the second connection member.

10. The vehicle front structure according to claim 1, wherein each extension portion and the bumper back beam are fastened by connecting a fastener to the recess.

11. The vehicle front structure according to claim 1, wherein each front side member comprises a mass-produced steel pipe having a closed cross section.

12. The vehicle front structure according to claim 1, wherein the bumper back beam comprises a high-tensile strength steel plate.

13. The vehicle front structure according to claim 1, wherein the pair of fender upper members is connected to an upper crossmember through a pair of strut bars.

14. A vehicle front structure comprising:
a pair of front side members;
a pair of fender upper members located above the pair of front side members, respectively;
a bumper back beam connecting front ends of the pair of front side members; and
a front end module connected to the pair of front side members and the pair of fender upper members, wherein the front end module includes an upper member, a lower member located below the upper member, and a pair of side members connecting both ends of the upper member and both ends of the lower member, respectively;
wherein each front side member includes a pair of extension portions provided on a front end thereof;
wherein the pair of extension portions define an opening therebetween;
wherein each end portion of the bumper back beam is inserted into the opening of the corresponding front side member;
wherein the pair of extension portions are joined to the end portion of the bumper back beam; and
wherein each extension portion has a recess which is recessed toward the bumper back beam.

15. The vehicle front structure according to claim 14, wherein each of the upper member, the lower member, and the pair of side members comprises a mass-produced steel pipe having a closed cross section.

16. The vehicle front structure according to claim 14, wherein:
the upper member and each side member have the same cross-sectional area; and
the lower member has a larger cross-sectional area than the cross-sectional area of the upper member and the cross-sectional area of the side member.

17. A vehicle comprising:
a vehicle body comprising a lower frame, a pair of front pillars disposed in front of the lower frame, a pair of roof rails connected to the pair of front pillars, respectively, a pair of windshield members extending obliquely from the pair of roof rails to a pair of fender upper members, and an upper crossmember connecting the pair of front pillars;
a pair of front side members connected to the lower frame;
a pair of fender upper members disposed above the pair of front side members, respectively;
a bumper back beam connecting front ends of the pair of front side members; and
a front end module connected to the pair of front side members and the pair of fender upper members,
wherein each front side member includes a pair of extension portions provided on a front end thereof;
wherein the pair of extension portions define an opening therebetween;
wherein each end portion of the bumper back beam is inserted into the opening of the corresponding front side member;
wherein the pair of extension portions are joined to the end portion of the bumper back beam; and
wherein each extension portion has a recess which is recessed toward the bumper back beam.

18. The vehicle according to claim 17, further comprising a plurality of connection members connecting each fender upper member and a corresponding one of the pair of front side members in a height direction of the vehicle, wherein the plurality of connection members includes a first connection member close to the front end module, and a second connection member spaced apart from the first connection member toward a rear of the vehicle.

19. The vehicle according to claim 17, wherein:
each fender upper member connects the front end module and a corresponding front pillar; and
the fender upper member extends in a longitudinal direction of the vehicle.

20. The vehicle according to claim 17, wherein each fender upper member includes a first extension portion connected to the front end module, a second extension portion connected to a corresponding front pillar, and a shock absorber bracket mounted between the first extension portion and the second extension portion.

* * * * *